(No Model.) 2 Sheets—Sheet 1.
W. H. SKERRITT.
SAFETY DEVICE FOR ELEVATORS.
No. 264,352. Patented Sept. 12, 1882.
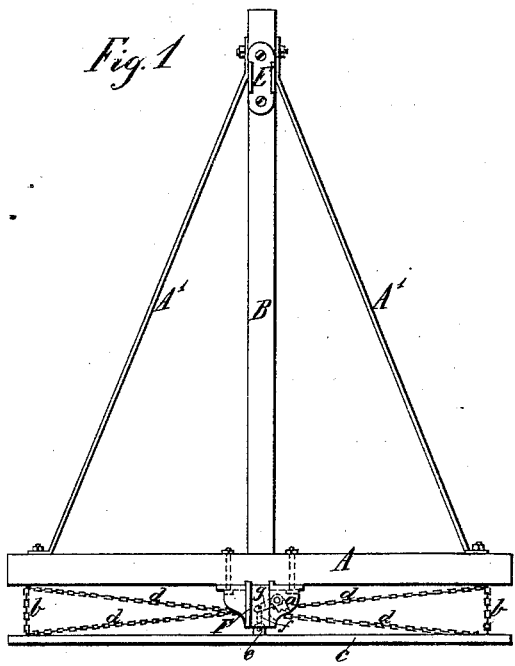
Fig. 1
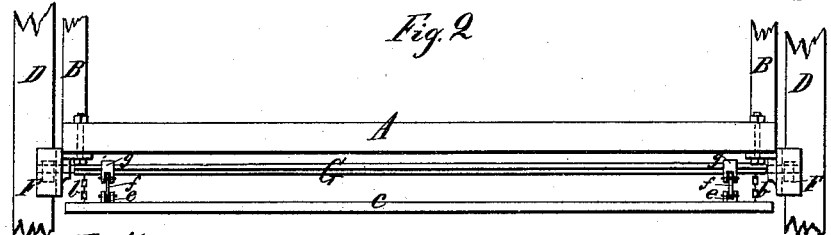
Fig. 2
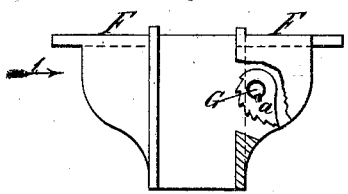 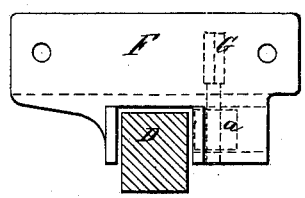 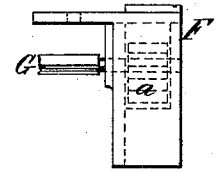
Fig. 3    Fig. 4    Fig. 5
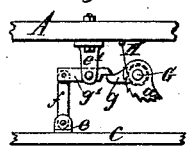 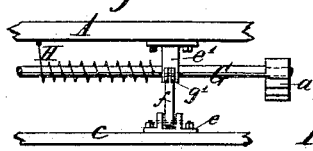
Fig. 6    Fig. 7
Witnesses:
O. F. Malmborg.
Alex F. Roberts
Inventor:
Wm Henry Skerritt
by A. W. Almqvist
Attorney.
N. PETERS, Photo-Lithographer, Washington, D. C.

(No Model.) 2 Sheets—Sheet 2.
W. H. SKERRITT.
SAFETY DEVICE FOR ELEVATORS.
No. 264,352. Patented Sept. 12, 1882.
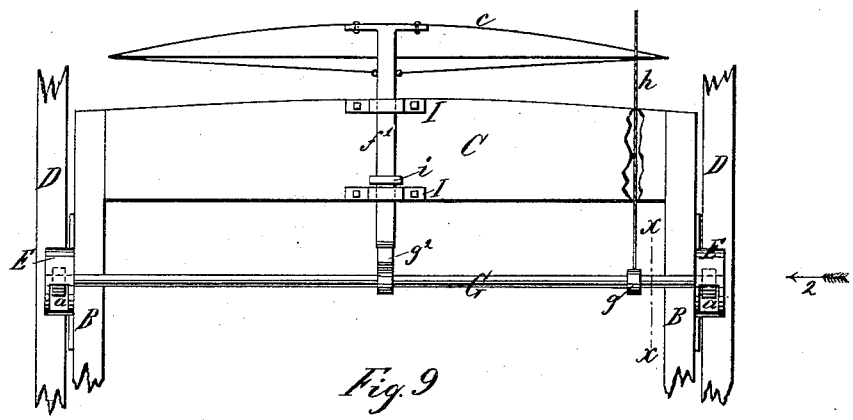
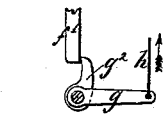
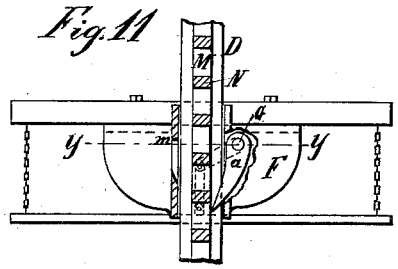
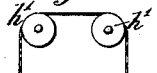
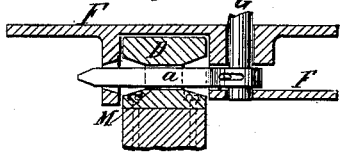
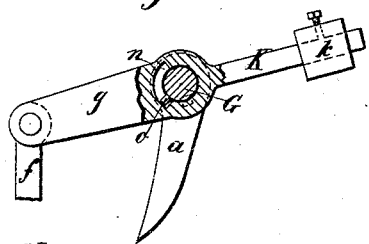
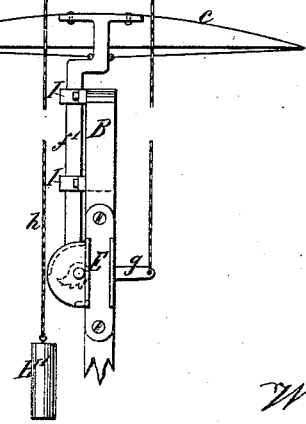
Witnesses:
O. F. Malmborg
Alex. F. Roberts
Inventor:
Wm Henry Skerritt
by A. W. Almqvist
Attorney.
N. PETERS. Photo-Lithographer, Washington, D. C.

UNITED STATES PATENT OFFICE.

WILLIAM HENRY SKERRITT, OF JERSEY CITY, NEW JERSEY.

SAFETY DEVICE FOR ELEVATORS.

SPECIFICATION forming part of Letters Patent No. 264,352, dated September 12, 1882.

Application filed May 15, 1882. (No model.)

*To all whom it may concern:*

Be it known that I, WM. HENRY SKERRITT, a citizen of the United States, and a resident of Jersey City, in the county of Hudson and State of New Jersey, have invented certain new and useful Improvements in Safety Devices for Elevators, of which the following is a specification.

The object of my invention is to provide an automatic device of positive action to stop the motion of a descending elevator-car or other hoisting apparatus, and thus prevent its fall, when from breakage or slipping of the suspension-rope or from the derangement of the working machinery or belts the velocity of the motion of the car becomes such as to endanger life or property. In so-called "safety-elevators" as heretofore generally constructed the operation of the safety device depends upon the breaking of the rope by which the car is suspended; but if a cog-wheel or some other part of the machinery which controls the revolving of the rope-drum breaks, (which they are more liable to than a wire rope,) and thus the rope, without breaking, be unwound and the drum revolved by the weight and increased momentum of the falling car and its contents, there is nothing to prevent disastrous consequences. The operation of the safety devices of an elevator should therefore be made dependent only on the velocity of the descending car, regardless whether the breaking of the rope or anything else be the cause of such increased velocity. It is to this latter class of inventions that my present improvements pertain, the motion to operate the stopping devices being obtained from a disk or parachute actuated by the counter action of a subjacent column of air at a falling of the platform. Means have been invented purporting to accomplish this by the intervention of electricity; but the expense and constant attention necessary to keep the same in working order renders the use of electricity less desirable.

The device forming the subject of my present invention is intended to be positive in its action and to need no attention or expense to keep it in working condition, to be instantaneous in its action, and not liable to get out of order.

In the accompanying two sheets of drawings, Figure 1 represents a side view of a platform or car of a freight-elevator. Fig. 2 is a front view of the same partly broken away, and of portions of its guiding-posts. Fig. 3 is a detail face view of one of the guide-brackets and its tightening-cam. Fig. 4 is a top view of the same, showing also the guide-post in cross-section. Fig. 5 is an edge view of the said bracket, seen in the direction of arrow 1 in Fig. 3. Fig. 6 is a detail view of a modification of the safety devices, seen in the same direction as in Figs. 1 and 3. Fig. 7 is a detail view of the same, seen in the same direction as in Fig. 2. Fig. 8 is a front view of the upper portion of the car and portions of the guide-posts, showing the devices as applied to the top instead of bottom of the car. Fig. 9 is a detail section taken on the line $x\ x$ of Fig. 8, and seen in the direction of the arrow 2, and showing the manner of retaining the tightening-cams from contact with the posts under ordinary velocities of the car; and Fig. 10 is a side view of the safety device, constructed in accordance with Fig. 8, and seen in the direction of the arrow 2. Fig. 11 is a side view of the car-platform and the most preferred construction of my safety device, the guide-bracket being partly broken out and a portion of the guide-post shown in vertical section. Fig. 12 is a detail horizontal section of the same, taken on the line $y\ y$ of Fig. 11, showing the stop-dog in position as when supporting the platform. Figs. 13 and 14 are detail views explanatory of the operation of the stop-dog.

A is the platform of an elevator freight-car. B are the upright side posts of the same. C is the top cross-beam connecting the posts B. A' are braces connecting the platform with the upright portions. D are the vertical guide-posts, between which the car travels, being guided on the said posts by the brackets E F, attached to the car respectively at the top and bottom of the posts B. In each bracket F, adjacent to one side of the guide-post D, is arranged in a socket or between lugs a tightening-cam, $a$, preferably serrated upon its working-surface. The said cams are secured upon the opposite ends of a shaft, G, which reaches across the full width of the car and has its bearings in the said lugged or socketed portions of the brackets F.

In the first sheet of drawings the shaft G is shown as arranged underneath the platform A. Beneath the shaft G is suspended by four small chains, $b$, from the platform A, a large thin plate, c, which may be made of thin metal or of wood, or some other light substances easily raised by a swift current of air from below. To prevent the plate c from being deflected toward one side in rising, I attach to the same and to the under side of the platform A chains d, arranged diagonally in the manner shown in Fig. 1. It is evident that instead of the chains b and d cords or other means may be used, so long as they are flexible, the object being to utilize the entire surface of the plate c as the working-surface to be acted upon by the air, and thus make the device more sensitive to effectively operate the stops. In the center line of the plate c, I attach to its upper surface, at either side of the car, a lug, e, connected by a link, f, to an arm, g, secured upon the shaft G. If, from any accident to the machinery, the car should suddenly fall, and thus descend with a more than normal velocity, the current of air will raise the plate c, causing the links f to press upward the free ends of the arms g, thereby turning the shaft G a little in its bearings, and causing the cams a to impinge upon the adjacent sides of the guide-posts D, thus instantly arresting the motion of the car. It is evident that as soon as the face of the cams a touches the sides of the posts the friction will turn them farther in the same direction, and, aided by the weight of the car, will cause them to impinge with and secure a firm grip upon the posts.

Instead of pivoting the link f to the arm g, so as to cause it to tighten the cam a by pushing directly upon the free end of the arm g, a spring, H, may be attached with one end to the shaft G and the other end to the under side of the platform A, as shown in Figs. 6 and 7, in such a manner as to have a tendency always to turn the cam into contact with the guide-post. The said link f may be connected by a pivot to a trip-lever, g', fulcrumed to a lug, e', underneath the platform A, the free end of the said trip-lever then bearing upon the extreme end of the arm g to retain the cam a from contact with the guide-post against the action of the said spring H, as shown in Fig. 6. In this case the operation will be substantially the same as before described. The plate c, raised by the air-current, will elevate that end of the trip-lever g' to which the link f is pivoted, thereby causing the other end of the trip-lever to descend enough to allow the free end of the arm g to slide off from contact with it, and thus setting the spring H free to act by its tension to tighten the cam against the post.

Instead of arranging the plate or disk c underneath the platform A, it may be arranged above the car, in which case the shaft G and cams a have their bearings in the upper guide-brackets, E, instead of the lower, F, in which case the disk c acts by receding from instead of pushing upon the trip-lever. In this case the disk c may be made somewhat in the shape of an umbrella of fine veneer or some other light substance, in about the shape shown in Figs. 8 and 10, and is fastened upon the end of a bolt, f', which replaces the link f, previously described, and sliding in lugs, cleats, or staples I, attached to one of the upright sides of the cross-beam C. The slide-bolt f' is provided with a shoulder, i, by which it is supported upon the lower guide-cleat, I, when in its lowest position. The pivoted trip-lever g' is for this purpose replaced by simply a small arm or toe, g'', secured upon the shaft G, which toe bears with its extreme end against the side of the slide-bolt f' at the extreme lower end of the latter.

Instead of using the spring H, I prefer to maintain a tendency of the cams a to impinge upon the side surface of the posts D by means of a weight, H', attached to one of the pendent ends of a rope, h, which rope runs over one or more pulleys, h', pivoted in some suitable part of the building above the travel of the elevator, the other pendent end of the said rope h being attached to the aforesaid arm g, secured upon the shaft G, as shown in Figs. 9 and 10.

It is evident that the current of air through the elevator-shaft, caused by any undue downward velocity of the car, will cause the device c (shown in Fig. 8) to raise, and thus withdraw the bolt f' from contact with the toe g'', thus allowing the weight H' to preponderate, and in its fall raise the free end of the arm g and turn the cam a with its face in contact with the side of the guide-post D, thereby arresting the motion of the car; but instead of a cam tightening against the vertical surface of the post, I much prefer the construction of the stop a and post D shown in Figs. 11 to 14, by which a start of the platform to fall causes the dog or stop a to pass through a slot or opening of the guide-post and to lodge or become locked in a horizontal position, when its free end strikes against a shoulder, m, or other solid part of that guide-flange of the bracket F which works in contact with the post-surface opposite to the side at which the shaft G has its bearings, and from which the dog a enters the cross-slots M in the post D. The post is preferably made of iron, and if of cast-iron the slots M are formed in the casting throughout the height of the post, as close together as is consistent with obtaining adequate strength of the solid portions N between them.

In order to make sure that the point of the dog a, when caused to impinge upon the rail or post D, shall not slide down in contact with the latter without entering the nearest slot M, the rail or post is provided longitudinally with a V-groove, forming a gradually-narrowing entrance to the series of slots M, the converging sides of the groove ending in the vertical sides of the slots, as shown in Fig. 12. The point of the dog is tapered, and when the dog is suspended in its normal position, as in Fig. 11, travels within the said groove. When, by an undue velocity of the downward movement of the car, the plate c is raised a little, and by means of the link *f* and arm *g* turns the shaft G and causes the point of the dog *a* to be moved against the post D, the said point will of course enter the first slot M which it meets. The curved back of the dog at its point will strike against the bottom of the slot entered, and the dog will be swung on its pivot until its point has passed clear through the slot M and swung up through a V-shaped slot in the opposite guide-flange of the bracket F until at the upper end of the latter slot it is stopped by the shoulder or solid portion *m*. (See Fig. 11.) The dog is then held in a horizontal position by the shaft G and shoulder *m*, and supports the car on one of the solid portions N at the bottom of the slot M, in which it rests. To allow the dog *a*, on entering the slot M, to swing into the horizontal position without necessitating any further motion of the disk *c*, link *f*, and arm *g*, I make a circular slot, *n*, in the inner circumference of the hub of the arm *g*, make the latter loose on the shaft G, and insert through the slot *n* into the shaft G a pin, *o*, arranged to bear against the lower end of the slot *n* in ready working contact, as in Fig. 14, when in the ordinary or normal position. The stops or dogs *a* are keyed upon the shaft G. When the disk *c* rises the link *g*, acting against the pin *o*, will turn the shaft G enough to bring the point of the dog *a* into one of the slots M, when the weight of the platform or car will cause it to turn the further distance required, the pin *o* in the meantime moving in the circular slot *n* without exerting any pressure upon or causing any movement of the arm *g*.

Instead of slotting the arm *g* and securing the dog *a* upon the shaft G, the arm may be keyed on the shaft and the dog *a* slotted and movable on the shaft, as shown in Fig. 13; but I prefer the construction shown in Fig. 14. The hub of the arm *g* is provided with an arm, K, projecting on the laterally-opposite side of the shaft G, and on the arm K is applied a sliding weight, *k*, securable by a set-screw, the purpose of the weight being to counterbalance the parts *c f g*, so as to cause the disk *c* to be raised by a very slight air-pressure on its under side.

It is evident that the air-actuated device *c* may be arranged underneath the beam C, or one may be placed above and one below the car, and when arranged above it may be made to operate the shaft G and cams *a*, placed below the car, and if arranged below the car it may be connected to operate the said shaft and cams when placed in the position in which they are shown in Fig. 8.

It will be observed that instead of the cam *a* a wedge may be caused to enter between the bracket and the guide-post; or a slide from the bracket may be caused to enter notches in the post with the same result in stopping the car.

Having thus described my invention, I claim as new and desire to secure by Letters Patent—

1. In an elevator safety device operating at a falling of the platform, the combination, with the disk *c* and with a stop, *a*, and intermediate connections to bring said stop in contact with the stationary post D of the elevator-shaft, of the suspension-chains *b* and the chains *d*, arranged diagonally, or their flexible equivalents, substantially as and for the purpose set forth.

2. In an elevator safety device operating at a falling of the platform, the disk *c*, suspended by chains *b* and steadying-chains *d*, or their flexible equivalents, and provided with the link *f*, in combination with the shaft G, having arms *g*, and provided with tightening devices *a* contiguous to the surface of the post D, substantially as hereinbefore set forth.

3. In an elevator safety device operating at a falling of the platform, the disk *c*, suspended by chains *b* and having lateral steadying-chains *d*, or their flexible equivalents, and provided with the link *f*, in combination with the trip device *g' g*, or the described equivalent, *f'* and *g''*, and with the shaft G, provided with the end cams or stopping devices *a* contiguous to the surfaces of the posts D, substantially as set forth.

4. In an elevator, the combination, with an actuating device operating at a falling of the platform A, and with a stationary post, D, provided at suitable intervals with slots or perforations M, of a stop or dog, *a*, pivoted about the movable car or platform contiguously to said perforated post, said dog being impelled by said actuating device to enter one of the said perforations, and thus interlock the car and post, substantially as and for the purpose set forth.

5. The combination, with an actuating device operating at a falling of the platform A, and with a stationary post, D, having perforations M, as described, of the dog or stop *a* and bracket F, the said dog being pivoted in the said bracket contiguously to one side of the perforated post, and the said bracket having a shoulder, *m*, in its guide-flange at the side of the post opposite to the dog, substantially as and for the purpose set forth.

6. The combination of the dog *a* and perforated post D with the actuating devices *c f g* G, the same having suitable slip-motion devices, *n o*, between the arm *g* and dog *a*, to enable the latter to turn independently when started by the former, substantially as and for the purpose set forth.

7. In an elevator, the combination, with the safety devices *c f*, operating as described, and with the shaft G and stop *a*, of the arm *g*, pivoted upon the said shaft and provided with the counter-extension K and adjustable weight *k* upon said extension, substantially as and for the purpose set forth.

In testimony that I claim the foregoing as my invention I have signed my name, in presence of two witnesses, this 11th day of May, 1882.

WILLIAM HENRY SKERRITT.

Witnesses:
A. W. ALMQVIST,
ALEX. F. ROBERTS.